Nov. 14, 1944.                 C. A. FRISCHE                    2,362,476
                           BALANCED VALVE STRUCTURE
                         Original Filed Oct. 19, 1940
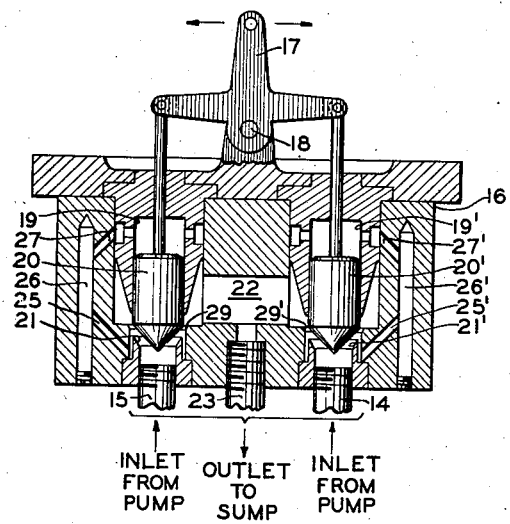
*INVENTOR.*
CARL A. FRISCHE
BY
*Herbert H. Thompson*
HIS ATTORNEY Patented Nov. 14, 1944

2,362,476

UNITED STATES PATENT OFFICE 2,362,476

BALANCED VALVE STRUCTURE

Carl A. Frische, Great Neck, N. Y., assignor to Sperry Gyroscope Company, Inc., Brooklyn, N. Y., a corporation of New York Original application October 19, 1940, Serial No. 361,860. Divided and this application June 17, 1943, Serial No. 491,103

7 Claims. (Cl. 251—20)

The present divisional application is based on the balanced valve subject matter shown and described in the parent case, filed October 19, 1940, Serial No. 361,860 by Carl A. Frische and Orland E. Esval, for an improvement in Servo mechanisms.

This invention relates to a balanced valve structure.

The structural details of the invention will be apparent from the following description when read in relation to the accompanying drawing in which the single view shown is a vertical section taken through the improved valve.

Pipes 14 and 15 provide inlet connections for the valve body 16. Fluid is supplied to the two inlet openings in the valve body 16 by way of the pipes 14 and 15 from suitable pumps (not shown). As illustrated, the valve has an operating lever or controlling member 17 pivoted at 18 by which valve pistons 20 and 20' are differentially controlled. Closed end cylinders 19 and 19' are provided in the valve body for receiving the respective pistons therein. The pistons project beyond the open end of the cylinders in which they are slidably mounted and cooperate with the adjacent respective nipples or valve seats 21 and 21'. The pistons do not actually close down upon their respective seats, so that there is a continuous flow of fluid from pipes 14 and 15 through the seats, past the valve pistons through common outlet passage in the valve body into the outlet or sump pipe 23.

In accordance with the teaching of the present invention, each of the valve pistons 20 and 20' are substantially balanced. In this connection, the fluid pressure required is applied against the inner wall of the valve pistons by way of the respective ducts 25 and 25', channels 26 and 26', and ducts 27 and 27'. The last noted ducts lead to the respective cylinders 19 and 19' at the closed end thereof.

The heads of the valve pistons cooperating with the adjacent valve seats are conically tapered. The seat forming portion of the valve body is also conically tapered. The seat forming nipples 21 and 21' and the adjacent surrounding walls of the valve body are tapered as designated at 29 and 29'. It will also be noted that the heads of the valve pistons 20 and 20' are tapered at a different angle than the uniform taper of the nipples and the adjacent portion of the valve body thereto. Thus, if the upper ends of the seats or nipples 21 and 21' are tapered at an angle of 30° with respect to the piston axis, i. e., subtend an angle of 60°, which is also true of the taper of the valve body adjacent thereto, then the lower ends or heads of the valve pistons 20 and 20' may be tapered at an angle of 45° with respect to the piston axis.

The inlet to ducts 25, 25' is located at a point in the valve intermediate the entrance of fluid to the valve and the exit of fluid therefrom, the exact positioning of the same serving to determine the back pressure to be exerted on top of the valve pistons 20 and 20'. The duct opening is situated at a fluid throttling passage defined by the adjacent surfaces of the piston and seat providing portions of the valve. Due to the tapering annular passage between the head of the respective valve pistons and their seats, the velocity of fluid flow will be greatest at the periphery of the valve piston head and the least at the center. By the Bernouilli principle of hydrodynamics, this results in a decreased pressure at the periphery of the valve so that the average pressure on the valve piston head is lower than the pressure in the corresponding fluid inlet pipe. If the duct 25 or 25' were to transmit the pressure of the inlet pipes to the rear of either of the valve pistons, one of the individual valves would be drawn closed. However, a pressure gradient exists through the annular passages and the ducts 25, 25' are tapped off at a point suitable for obtaining proper pressure in the closed end of the respective valve cylinders to substantially balance the average pressure applied to the respective piston heads. The back pressure obtained will always be slightly less than or, at most, equal to the average pressure on the piston heads despite the various conditions of fluid flow through the individual valves and will therefore supply satisfactory balancing action at all times.

In this manner control of the pressure at the rear of the respective valve pistons 20 and 20' is obtained. The valves are operated by application of a slight force to the differentially controllable lever 17 in this instance, as indicated by the arrows in the drawing.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A fluid controlling balanced valve having a valve body with inlet and outlet openings and including an open-ended cylinder, a slidable valve piston in said cylinder having a conically tapered head, a conical seat for said piston positioned in said body, an annular passage between said seat and said head through which fluid flows in passing from the inlet to the outlet openings, a duct connecting an intermediate point of said passage with the rear of the valve piston, and means for moving said valve piston.

2. A valve of the character claimed in claim 1, in which the conical seat has an angle of taper less than that of the head of the piston.

3. A valve of the character claimed in claim 1, in which the angle of taper of the seat is 30°, and the angle of taper of the head of the valve piston is 45°.

4. A balanced valve comprising a valve body having a closed end cylinder formed therein, a valve piston slidably mounted in said cylinder having one end thereof projecting exteriorly of the cylinder, a valve seat in the body for the projecting end of the piston, the adjacent surfaces of the piston and seat defining a fluid throttling passage therebetween, a duct connecting the closed end of the cylinder with a point in said passage, and means for moving said valve piston.

5. A balanced valve having a tapered seat and a valve piston whose seat cooperating end is tapered at an angle different than the angle of taper of the seat, the adjacent annular surfaces of the seat and piston defining a fluid throttling passage, a duct connecting the opposite end of the valve piston with a point in the passage, and means for controlling said valve piston.

6. A fluid-controlling valve comprising a valve body having a closed end cylinder formed therein, a valve piston movable in said cylinder having one end thereof projecting exteriorly of the cylinder, a valve seat in the body for the projecting end of the piston, the adjacent surfaces of the piston and seat defining a fluid throttling passage therebetween, and a duct connecting the closed end of the cylinder with a point in said passage.

7. A valve of the character claimed in claim 6, in which said duct is formed in the valve body.

CARL A. FRISCHE.